United States Patent
Ross et al.

(10) Patent No.: US 6,545,286 B1
(45) Date of Patent: Apr. 8, 2003

(54) METHOD AND APPARATUS FOR WATER LEVEL DETERMINATION

(75) Inventors: Jerry Hubert Ross, Waveland, MS (US); Eugene Clark Hayes, Diamondhead, MS (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 0 days.

(21) Appl. No.: 09/433,075

(22) Filed: Nov. 3, 1999

(51) Int. Cl.⁷ .............................................. G01N 21/85
(52) U.S. Cl. ........................ 250/577; 250/573; 73/293
(58) Field of Search .............................. 250/573–577, 250/201.1, 234–236; 356/249–255, 436, 440, 3.02; 33/377, 366.33; 73/293, 1.73; 340/603, 612, 619

(56) References Cited

U.S. PATENT DOCUMENTS

| | | | |
|---|---|---|---|
| 4,524,282 A | * | 6/1985 | King ........................... 250/577 |
| 5,973,770 A | * | 10/1999 | Carter et al. ................ 356/4.09 |
| 6,259,516 B1 | * | 7/2001 | Carter et al. ................. 250/577 |

\* cited by examiner

Primary Examiner—Que T. Le
Assistant Examiner—Thanh X. Luu
(74) Attorney, Agent, or Firm—Ross F. Hunt, Jr.

(57) ABSTRACT

A method and system are provided for determining the level of a body of water, whether free flowing or stationary. A rotatable reflective element is located at an area adjacent to the body of water. The reflective element is driven by a rotating motor shaft and includes a reflective surface extending 45° to the shaft axis. Rotation of the reflective surface provides scanning of a laser beam directed axially thereon. During scanning, the beam is directed at an angle to true vertical onto the surface of the body of water such that a portion of the beam is reflected from the surface. A detector array, located on the opposite side of the body of water and in a common horizontal plane with the reflective element, produces an output after receiving the reflected beam. A controller arrangement, including a counter which begins counting when-the scanned beam is vertical and which stops counting when a signal corresponding to the array output is received, determines the scan angle to true vertical. A simple calculation, based on the determined scan angle and the distance between the reflective element and the array, is then made of the distance from the common horizontal plane to the water surface so as to determine the water level.

19 Claims, 3 Drawing Sheets

METHOD AND APPARATUS FOR WATER LEVEL DETERMINATION

CROSS REFERENCE TO RELATED APPLICATION

This application discloses subject matter related to that disclosed in our concurrently filed, copending application Ser. No. 09/433,074, entitled WATER LEVEL MEASURING METHOD AND SYSTEM.

FIELD OF THE INVENTION

The present invention relates to methods and systems for measuring the water level of a body of water, whether free flowing water such as a river or stream or stationary such as a lake, reservoir or holding tank, and, more particularly, to an improved water level measuring method and system which does not involve mounting of the measurement equipment over the water surface, i.e., which enables water level measurements to be made from the edge of the water, e.g., from an embankment, platform or bridge structure adjacent to the water.

BACKGROUND OF THE INVENTION

Both mechanical and electromechanical devices are used to measure what is referred to as "stage" or water level with respect to a datum point. This is generally done from a bridge platform or structure in or over the water. Such water level measuring devices require that the sensor be in contact with water surface and in the majority of instances, require a specially built housing or enclosure, referred to as a stilling-well installation, to dampen or filter the turbulence of water in order to obtain a correct reading. Such stilling-well installations generally employ a long, typically two-foot diameter corrugated pipe attached vertically to an adjacent platform, and extending all of the way into a water column. All water level measurement instruments currently used by the United States Geological Survey (USGS) use the contact methods in determining water level and water flow, and, in this regard, there are nearly 7,000 sites throughout the United States which contain equipment or instruments for measuring water level.

With some devices, it is difficult to obtain a measurement of water level because of the lack of a platform or other structure for mounting the measuring equipment or instrument. Further, because the placement of such structures in parks and wildlife refuges detracts from the natural beauty of the environment, the structures are often located at sites which are out of the way and difficult to get to, and substantial time and expense is incurred in transporting personnel to visit, and make measurements at, these largely inaccessible sites. Moreover, there are many areas for which water level information is needed but cannot be obtained because of the cost and manpower necessary to prepare a site for installation of equipment. Further, because at least with USGS installations, a majority of the stage measuring instruments are mounted on bridge platforms, the installation of the instruments and extraction of the data can be hazardous.

Some prior art commercial systems use measuring or sensing beams and require that the sensing or measuring beam (which may be a radar beam or laser beam) be mounted such that the beam projects directly vertically downward to the water surface. Further, the characteristics of the measuring beam itself (e.g., whether in pulsed mode or continuous mode of operation) are employed in making the measurement, and this can often complicate the associated electronic circuitry required. In such systems, beam characteristics such as time-of-flight or change in phase are used in determining the water level, in contrast to the present invention which, as explained below, uses simple geometry in calculating the water level.

SUMMARY OF THE INVENTION

In accordance with the invention, a method and system are provided for the determination of the water level of both free flowing bodies of water (e.g., rivers or streams) and stationary bodies of water (e.g., lakes, reservoirs or holding tanks), which overcome or substantially eliminate the above-discussed problems associated with prior art methods and devices.

Among other important advantages thereof, the invention does not require the system apparatus be positioned vertically above the water surfaces, i.e., the apparatus need not be mounted on a structure (bridge or platform) which is located over or across the water but instead can be sited and operated at the edge of the body of water. Further, the invention can be used in measuring water levels in canyons, from bluffs and in highly inaccessible areas wherein a conventional water level measurement device would normally be positioned directly vertical with respect to the water surface. Further, as indicated below, the invention makes water level measurements based on simple geometry, i.e., uses no electronic or electromechanical or mechanical contact of a sensor with the water surface, and thus eliminates the problems associated with contact systems, such as damage to the sensor caused by floating or submerged objects in free flowing water. In addition, installation of the invention at new sites, which is done periodically by the USGS, can be carried out with substantial cost savings, because, inter alia, there is no need for stilling wells.

In accordance with a first aspect of the invention, a system is provided for determining the level of a body of water, whether free flowing or stationary, the system comprising: a rotatable reflective element including an inclined reflective surface; a light source for directing a light beam along a first path onto the reflective surface so that the beam is reflected from that surface and redirected along a further path; a motor for rotating the reflective element so that the redirected beam is scanned and so that, during scanning thereof, the redirected beam is directed onto the surface of the body of water such that at least a portion of the redirected beam is reflected from the surface as a reflected beam; an optical detector array, located at a determined distance from the reflective element on the opposite side of the body of water from the reflective element and in a common horizontal plane with the reflective element, for receiving the reflected beam and for producing an output in response thereto; and controller means for receiving the output of said optical detector array, for determining, based on said output, the scan angle of the beam with respect to true vertical, and for calculating, based on the determined scan angle and the determined distance between the reflective element and the optical detector array, the distance from the common horizontal plane to the water surface so as to determine the water level.

Preferably, the controller means includes a controller for receiving the array output and for producing a corresponding control signal, and a counter controlled by said controller for, responsive to receiving the control signal, producing a scan angle count related to the scan angle. The controller means preferably further comprises an optical detector positioned with respect to the reflective element for receiving the redirected beam during scanning thereof and for, responsive to receiving the redirected beam, transmitting a start signal to the counter to initiate the scan angle count. Advantageously, the optical detector is positioned vertically beneath the reflective element so as to receive the redirected beam when the beam is directed vertically downward during scanning thereof.

In a preferred implementation, the detector array produces a further output responsive to receipt thereby of the redirected beam as reflected from the reflective element along a horizontal path in said common plane, and the controller, responsive to receiving the further output, produces a further control signal for the counter so that the counter produces a further count related to the time required for scanning rotation of the beam between vertical and horizontal positions. The controller means then divides the further count by 90 to produce a value of degrees per count and multiplies the scan angle count by said value to produce a scan angle value.

In one preferred embodiment, the controller is located on the opposite side of the body of water and the control means transmits its control signals to the counter across the body of water. In one implementation of this embodiment, the control means further comprises a further light source connected to the controller for producing light signals based on the control signals and an optical detector connected to the counter for receiving the light signals and converting the light signals into count control signals for the counter. In an alternative implementation, the control means further comprises an r.f. modem connected to the controller for producing r.f. signals based on the control signals and an r.f. modem receiver connected to the counter for receiving the r.f. signals and converting the r.f. signals into count control signals for the counter.

Advantageously, the reflective element is mounted on a motor shaft having a substantially horizontal longitudinal axis and the reflective surface is inclined at an angle of 45° to that longitudinal axis. Preferably, the light source comprises a laser. The motor preferably comprises a continuously rotating motor for providing continuous scanning of the redirected beam through 360°.

According to a further aspect of the invention, a method is provided for determining the level of a body of water, whether free flowing or stationary, the method comprising: scanning a laser beam reflected at a variable angle to true vertical from a rotatable reflective element located at an area adjacent to but spaced from the body of water, so that the beam is directed onto the surface of the body of water during scanning and that at least a portion of the beam is reflected from that surface; receiving the portion of the beam reflected from the surface with a detector array located on the opposite side of the body of water from, and in substantially the same horizontal plane as, said reflective element; determining the scan angle to true vertical at which the portion of the reflected beam is received by said detector array; and using (i) the scan angle to true vertical so determined, and (ii) the distance between the reflective element and the detector array, to calculate the distance from said horizontal plane to the water surface so as to determine the water level.

Preferably, the scan angle is determined using a controller to produce a control signal when the detector array receives the reflected beam, and a counter controlled by the controller for, responsive to receiving that control signal, producing a scan angle count related to the scan angle. Advantageously, an optical detector is positioned with respect to the reflective element so as to receive the beam during scanning thereof and a start signal is transmitted by the optical detector to the counter, responsive to receiving said beam, so as to initiate the scan angle count.

In a preferred implementation, the detector array is used to produce an output responsive to receipt thereby of a beam reflected from the reflective element along a horizontal path in the common horizontal plane and the controller, responsive to receiving this output, generates a further control signal for the counter so that the counter produces a further count related to the time required for scanning rotation of the beam between vertical and horizontal positions. This further count is divided by 90 to produce a value of degrees per count and the scan angle count is multiplied by this value to produce a scan angle value.

In one preferred implementation, the controller is located on the opposite side of the body of water with the array, and the control signals are transmitted to the counter across the body of water. In one embodiment of this implementation, a further laser, connected to the controller, is used to produce light signals based on the control signals and an optical detector, connected to the counter, is used to receive the light signals and to convert these light signals into a count control signal for the counter. In an alternative embodiment of this implementation, an r.f. modem, connected to the controller, is used to produce r.f. signals based on the control signals and an r.f. modem receiver, connected to the counter, is used to receive the r.f. signals and to convert these r.f. signals into count control signals for the counter.

Preferably, the laser beam is scanned by using a continuously rotating motor to continuously rotate the reflective element.

Further features and advantages of the present invention will be set forth in, or apparent from, the detailed description of preferred embodiments thereof which follows.

DESCRIPTION OF THE PREFERRED EMBODIMENTS

Figure 1:
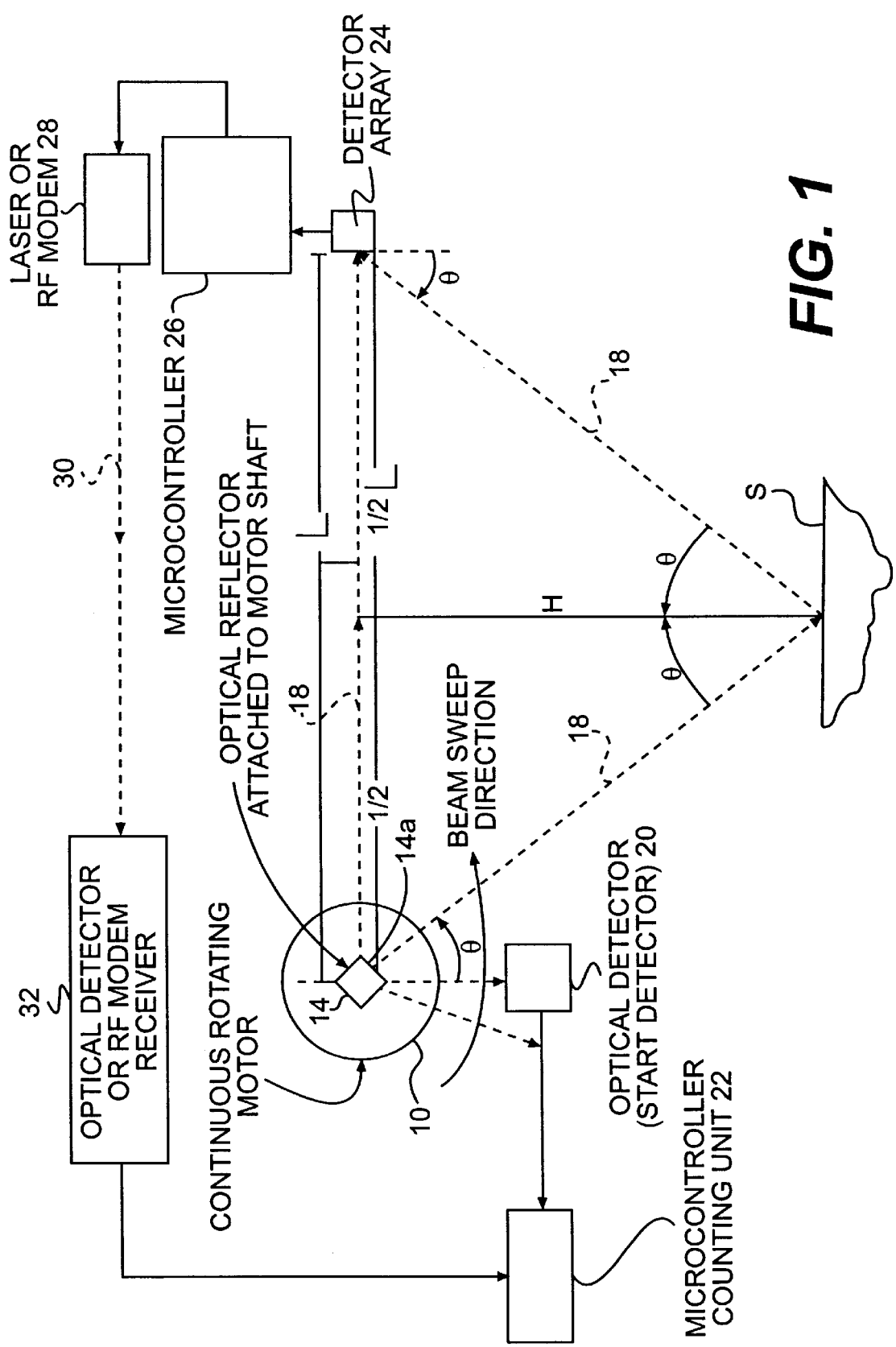
FIG. 1 is a schematic side elevational view of a preferred embodiment of a water level determination system in accordance with the invention.
Figure 2:
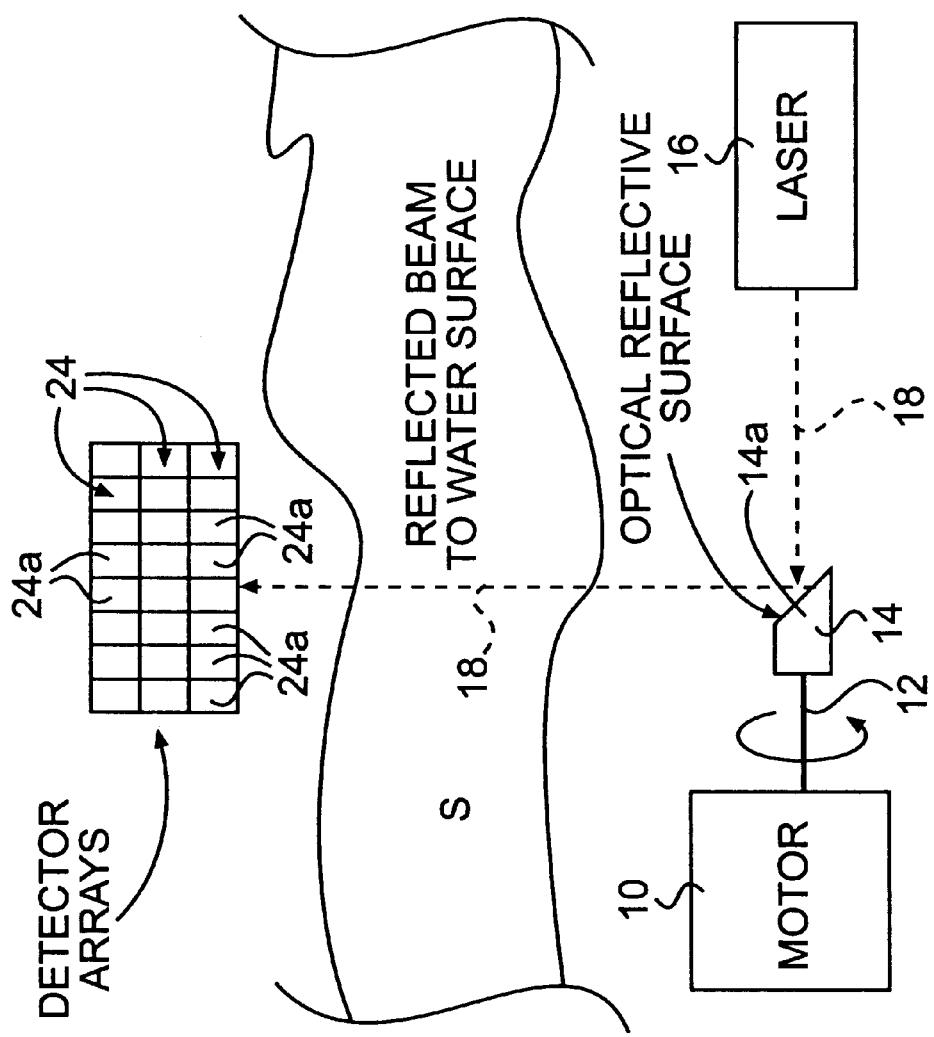
FIG. 2 is a schematic top plan of the embodiment of FIG. 1, with element omitted for purposes of illustration.

Referring to FIGS. 1 and 2, there is shown a preferred embodiment of the fluid level measuring system of the invention. The system includes a single rotating motor 10 which is mechanically coupled by a motor shaft 12 to an optical reflector 14 mounted on shaft 14. The optical reflector 14 includes a mirror surface 14a at the distal end thereof which, as shown in FIG. 2, is cut at a 45 degree angle, i.e., forms an angle of 45 degrees with respect to the shaft axis. In this regard, while the optical reflector 14 clearly can be of a shape, in transverse cross section, other than the square shape shown in FIG. 1 (e.g., circular, triangular, etc.), it is important that the reflector 14 have a reflecting flat surface 14a at 45 degrees with respect to the motor shaft 12 which normally extends horizontally.

As shown in FIG. 2, a laser 16 is positioned level with, and along the same horizontal axis as, the motor shaft 12, and perpendicular to a vertical plane through the distal end of reflector 14. Laser 16 emits a laser beam 18 in the near infrared wavelength range (so as to be invisible to the eye) which is directed at the center point of optical reflector 14 so that, as indicated in FIG. 2, beam 18 is redirected at an angle of 90 degrees to the axis of the original path thereof.

As motor 10 rotates the optical reflector 14, a laser beam scanning line is generated. As shown in FIG. 1, an optical detector or "start" detector 20 is positioned directly beneath reflector 14 so as to receive the laser beam during scanning thereof. Detector 20 detects when the beam crosses its;position, and, responsive thereto, triggers a highly accurate, high frequency counter or microcontroller counting unit 22. The position of the start detector 20 is designated as the 0 degree position from the vertical. As the beam 18 begins an angular sweep from the vertical to the horizontal and thus sweeps across the water surface S, the level of which is to be measured, the beam is reflected off of the water surface S, as indicated in FIG. 1, at an angle which equal to the incident angle of the beam striking the surface S. A portion of the beam 18 that is reflected from surface S is detected by an optical detector array 24 as indicated in both FIGS. 1 and 2. Detector array 24 basically comprises a linear array of individual detectors 24a sensitive to the wavelength of the laser beam 18. As discussed below, several linear detector arrays may be stacked one on top of the other as shown in FIG. 2. When the reflected beam is detected by detector 24, the current count of the microcontroller counting unit 22 is determined. As indicated above, this count is initiated by an activating signal or trigger signal from start detector 20. Accordingly, the current count of unit 22 represents a value and resolution of the angle from the vertical. This angle corresponding to the current count of counting unit 22 at the time the reflected beam is detected by detector 24 is referred to as the scan angle.

Preferably, in order to provide high accuracy in resolving the angle of incidence of beam 18, and to provide for a self-calibrated count, the beam continues to rotate to horizontal plane (representing an angle of 90 degrees from the vertical), and the counter unit 22 continues to count until the beam 18 is detected again (at a much higher intensity) at the detector array 24. The current count of the counter unit 22 when this occurs is referred to as the "stop detection" count.

In order to stop the counter unit 24 at the appropriate count, the system shown at the top of FIG. 2 is used. When the beam strikes the detector array 24, a microcontroller 26 connected to the array 24 generates a signal which stops the counter unit 24. This is done in the preferred embodiment illustrated in FIG. 1 through the use of a laser (or r.f. modem) 28 which is triggered or activated by microcontroller 26 and, responsive thereto, generates a light (or r.f. electrical signal), indicated at 30, which is received by an optical detector (or r.f. modem receiver) 32. The latter, which is located at the same level as laser (or r.f. moden) 28, is electrically connected to microcontroller counting unit 22 and a trigger or count control signal from the optical detector 22 causes counting unit 22 to stop counting.

Through this arrangement, microcontroller 26 stops counting unit 22 when the beam is rotated to the horizontal as indicated by the horizontal dotted line 18 in FIG. 1. The count value or number registered by counting unit 22, which as indicated above is referred to as the "stop detection count," is representative of the total time of rotation of the laser beam from 0 degrees (beam vertical) to 90 degrees (beam horizontal). The total count of unit 22 is divided by 90 units to give a value of degrees per count. This value is then multiplied by the scan angle count described above so as to arrive at the final scan angle, θ, in degrees (see FIG. 1). If as indicated in FIG. 1, L is the horizontal distance between the reflector 14 and the detector array 24, H is distance to the water surface and θ is one angle of a right triangle wherein H and L/2 are the sides, H can be determined by simple geometry using the formula H=½L/tanθ or L/2tanθ.

Because the motor 10 continues to rotate in the same direction, during the continued operation of the system the laser beam will once again cross over, and be detected by, the start detector 20. This will restart the measuring cycle.

A number of further important features of the invention should be noted. The constant rotational speed of motor 10 can be electronically controlled to accommodate variations in the conditions encountered, or to increase the sensitivity of the optical detector array 24 (by providing more optical signal). For instance, it may be necessary to lower the motor scanning speed (e.g., from a typical 24 Hz to 18 Hz) so that more of the reflected signal from the water surface S strikes the detector array 24. This can be useful where the water is rough. A stronger signal will also permit the use of less sensitive detectors in instances where this is important because of cost considerations. Another reason to vary the motor speed of motor 10 is to accommodate different weather conditions such as heavy rain or fog. Such conditions can be automatically detected and the speed preset prior to the start of scanning or even during the scanning operation, thereby optimizing the system response and measuring function.

By using a linear detector array, i.e., a plurality of detectors 24a arranged in a line or row, as illustrated by detector 24, small changes in the horizontal angle can be permitted in, or accommodated by, the system without sacrificing accuracy. Further in this regard, as mentioned above and as illustrated in FIG. 2, a plurality of linear arrays 24 can be employed, stacked on top of the other, to form a vertical and horizontal array of detectors to enable these determinations to be more readily made or to determine other characteristics about the impinging laser beam.

Figure 3:
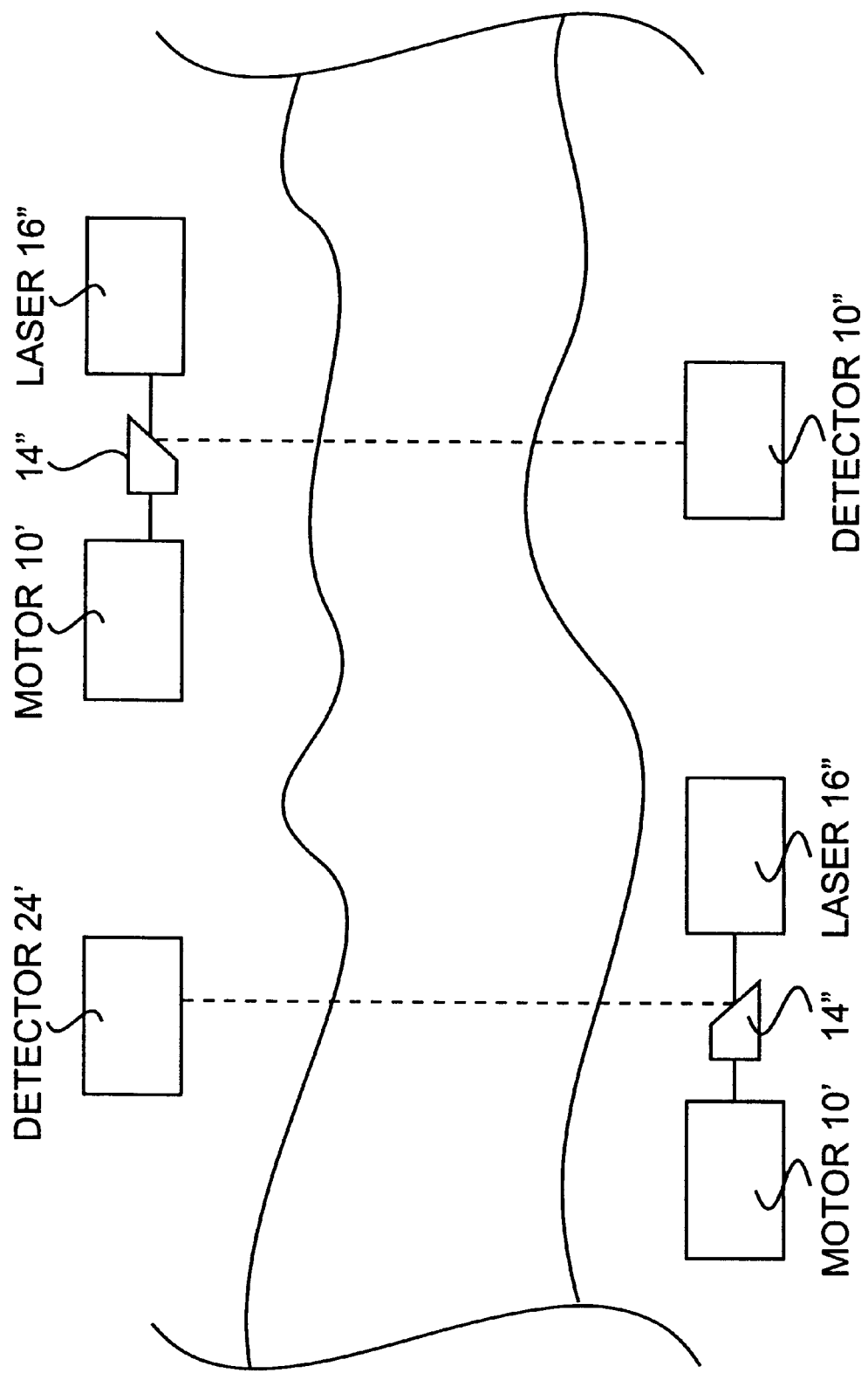
FIG. 3 is a schematic top plan view of a further preferred embodiment of the invention, employing duplicate water level determination systems.

In an alternative embodiment illustrated in FIG. 3 of the drawings, the entire system, i.e., the laser, motor and reflector, and detector array and associated microcontroller electronics, is duplicated on the opposite river bank so as to thus provide two laser beams which are scanned from opposite banks of the river. This is represented in FIG. 3 by a first measuring system comprising a motor 10', reflector 14', and laser 16' located on one bank and a detector 24' located on the opposite bank, and a second measuring system comprising a motor 10", reflector 14", and laser 16" located on the opposite bank and a detector 24" located on the one bank. In this embodiment, all laser, electronics and optical components are simply duplicated, thereby providing redundancy and a backup capability. Accordingly, in the event that, e.g., a laser or optical component of one system were to malfunction, the identical or duplicated system would continue to operate and provide the required water level and other information. This can be important because of the potentially destructive conditions that the systems must endure in the field.

The dual system approach also provides other advantages. It will be understood that production costs can be reduced where the identical electronics and hardware as employed for a large number of units. More importantly, the use of two separate systems, and thus the provision of two separate scanning beams, means that there is no need to provide for a separate reflected beam for the stop detector. Further, by using two scanning beams, quality assurance and measurement validity considerations are addressed because duplicate measurements are being performed at the same time (or at alternating times). In this regard, accuracy can be significantly improved by performing differential measurements, just as accuracy is improved by using the basic differential measuring technique (as employed, e.g., in differential GPS). The roughness or wave action of the water can be classified using this approach, thereby enabling the determination of characteristics of flowing water that could not previously be determined. It will be appreciated that although two duplicated systems are shown in FIG. 3, more could be employed.

It is also noted that the system of the present invention does not require dithering of the signal (beam), i.e., direct variable control of the beam to vary the beam position about a point or points. In the system described in the copending application mentioned above, dithering of the signal is preferably employed once a significant detection of a focussing position is determined. Because the present invention does not use signal dithering, the signal processing used must be somewhat more sophisticated in order to produce equivalent results, but the overall system is simpler and less costly. Further, because there is no direct control of the beam (i.e., no dithering), additional time will be required to produce equivalent samples. It is noted that a form of dithering can be provided with the present invention through the use of range gating, but this dithering can be only performed in a single scanning direction.

It is also pointed out that an optical reflector of a polygonal shape (i.e., having at least two reflecting surfaces) can be used and that while such a polygonal reflector would be more expensive to make, the reflector would provide more samples for each revolution of the motor and decrease the computational time required.

It will be appreciated from the foregoing that the invention provides a number of important advantages over the prior art. For example, the invention does not rely on detecting beam characteristics, such as time-of-flight or change in phase, in performing the water level measurement. In contrast, the laser beam is itself used to determine a straight line plumb and simple geometry is employed to determine the water level. Further, the device or system of the invention does not require mounting directly over and vertical to the water surface in order to make the necessary measurements. As will be evident, the system of the invention can be mounted on a river bank or atop a canyon wall and no bridge structure is required for supporting or mounting the system. In addition, the invention does not require fabrication and installation of a special platform or piling structure or the construction of a stilling well as discussed above. Still further, the invention performs measurements in a non-contact manner, i.e., no portion of the sensor is in contact with the water, and thereby avoids the problems associated with contact sensors described hereinbefore.

While the present invention and that of our copending application restricted to any particular use, the former is particularly useful where there are large separation distances between the units of the system such as would be the case with very wide rivers or broad lakes whereas the latter is particularly useful involving high elevations with respect to the water surface, such as those involving rivers flowing through canyons.

Although the invention has been described above in relation to preferred embodiments thereof, it will be understood by those skilled in the art that variations and modifications can be effected in these preferred embodiments without departing from the scope and spirit of the invention.

What is claimed is:

1. A system for determining the level of a body of water, whether free flowing or stationary, said system comprising:

a rotatable reflective element including an inclined reflective surface;

a light source for directing a light beam along a first path onto said reflective surface so that the beam is reflected from said surface and redirected along a further path;

a motor for rotating said reflective element so that the redirected beam is scanned and so that, during scanning thereof, the redirected beam is directed onto the surface of the body of water such that at least a portion of the redirected beam is reflected from the surface as a reflected beam;

an optical detector array, physically unconnected to and located at a determined distance from said reflective element on the opposite side of the body of water from said reflective element, in a common horizontal plane with said reflective element, for receiving the reflected beam and for producing an output in response thereto; and controller means for receiving said output of said optical detector array, for determining, based on said output, a determined scan angle of said reflected beam with respect to true vertical, at which the reflected beam is received by said optical detector array, and for calculating, based on said determined scan angle and the determined distance between the reflective element and the optical detector array, the distance from the common horizontal plane to the water surface so as to determine the water level, said controller means including a controller for receiving said output and for producing a corresponding control signal, and a counter controlled by said controller for, responsive to receiving said control signal, producing a scan angle count related to said scan angle.

2. A system as claimed in claim 1 wherein said controller means includes a controller for receiving said output and for producing a corresponding control signal, and a counter controlled by said controller for, responsive to receiving said control signal, producing a scan angle count related to said scan angle.

3. A system as claimed in claim 2 wherein said controller means further comprises an optical detector positioned with respect to said reflective element for receiving said redirected beam during scanning thereof and for, responsive to receiving said redirected beam, transmitting a start signal to said counter to initiate said count.

4. A system as claimed in claim 3 wherein said optical detector is positioned vertically beneath said reflective element so as to receive said redirected beam when said redirected beam is directed vertically downward.

5. A system as claimed in claim 3 wherein said detector array produces a further output responsive to receipt thereby of said redirected beam as reflected from said reflective element along a horizontal path in said common plane, wherein said controller, responsive to receiving said further output, produces a further control signal for said counter so that said counter produces a further count related to the time required for scanning rotation of the redirected beam between vertical and horizontal positions, and wherein said controller means divides said further count by 90 to produce a value of degrees per count and multiplies the scan angle count by said value to produce a scan angle value.

6. A system as claimed in claim 5 wherein said controller is located on said opposite side of the body of water and said control means transmits said control signals to said counter across the body of water.

7. A system as claimed in claim 6 wherein said control means further comprises a further light source connected to said controller for producing light signals based on said control signals and a further optical detector connected to said counter for receiving said light signals and converting said light signals into count control signals for said counter.

8. A system as claimed in claim 6 wherein said control means further comprises an r.f. modem connected to said controller for producing r.f. signals based on said control signals and an r.f. modem receiver connected to said counter for receiving said r.f. signals and converting said r.f. signals into count control signals for said counter.

9. A system as claimed in claim 1 wherein said reflective element is mounted on a motor shaft having a substantially horizontal longitudinal axis and wherein said reflective surface is inclined at an angle of 45° to said longitudinal axis.

10. A system as claimed in claim 1 wherein said light source comprises a laser.

11. A system as claimed in claim 1 wherein said motor comprises a continuously rotating motor for providing continuous scanning of said redirected beam through 360°.

12. A method for determining the level of a body of water, whether free flowing or stationary, said method comprising:

scanning a laser beam reflected at a variable angle to true vertical from a rotatable reflective element located at an area adjacent to but spaced from the body of water, so that the beam is directed onto the surface of the body of water during scanning and that at least a portion of the beam is reflected from the surface;

receiving the portion of the beam reflected from the surface with a detector array physically separated from, and located on the opposite side of the body of water from, and in substantially the same horizontal plane as, said reflective element;

determining the scan angle to true vertical at which the portion of the reflected beam is received by said detector array; and using (i) the scan angle to true vertical so determined, and (ii) the distance between the reflective element and the detector array, to calculate the distance from said horizontal plane to the water surface so as to determine the water level, said scan angle being determined using a controller for producing a control signal when said detector array receives said reflected beam and a counter controlled by said controller for, responsive to receiving said control signal, producing a scan angle count related to said scan angle.

13. A system as claimed in claim 12 wherein said scan angle is determined using a controller for producing a control signal when said detector array receives said reflected beam and a counter controlled by said controller for, responsive to receiving said control signal, producing a scan angle count related to said scan angle.

14. A system as claimed in claim 13 wherein an optical detector is positioned with respect to said reflective element so as to receive said laser beam during scanning thereof and wherein, responsive to receiving said laser beam, a start signal is transmitted by said optical detector to said counter to initiate said count.

15. A system as claimed in claim 14 wherein said detector array is used to produce an output responsive to receipt thereby of a beam reflected from said reflective element along a horizontal path in said horizontal plane, wherein said controller, responsive to receiving said output, generates a further control signal for said counter so that said counter produces a further count related to the time required for scanning rotation of the laser beam between vertical and horizontal positions, and wherein said further count is divided by 90 to produce a value of degrees per count and the scan angle count is multiplied by said value to produce a scan angle value.

16. A system as claimed in claim 15 wherein said controller is located on said opposite side of the body of water and said control signals are transmitted to said counter across the body of water.

17. A system as claimed in claim 16 wherein a further laser connected to said controller is used to produce light signals based on said control signals and a further optical detector connected to said counter is used to receive said light signals and to convert said light signals into a count control signal for said counter.

18. A system as claimed in claim 16 wherein an r.f. modem connected to said controller is used to produce r.f. signals based on said control signals and an r.f. modem receiver connected to said counter is used to receive said r.f. signals and to convert said r.f. signals into count control signals for said counter.

19. A system as claimed in claim 12 wherein said laser beam is scanned by using a continuously rotating motor to continuously rotate said reflective element.

* * * * *